L. I. YEOMANS & G. F. BRYANT.
MACHINE TOOL.
APPLICATION FILED AUG. 26, 1915.

1,205,588. Patented Nov. 21, 1916.

Witness:
J. C. Devick.

Inventors:
Lucien I. Yeomans
George F. Bryant.
By Miller & Chindahl
Attys

UNITED STATES PATENT OFFICE.

LUCIEN I. YEOMANS, OF CHICAGO, ILLINOIS, AND GEORGE F. BRYANT, OF PROVIDENCE, RHODE ISLAND, ASSIGNORS TO AMALGAMATED MACHINERY CORPORATION, OF CHICAGO, ILLINOIS, A CORPORATION OF NEW YORK.

MACHINE-TOOL.

1,205,588.  Specification of Letters Patent.  Patented Nov. 21, 1916.

Application filed August 26, 1915.  Serial No. 47,389.

*To all whom it may concern:*

Be it known that we, LUCIEN I. YEOMANS and GEORGE F. BRYANT, citizens of the United States, residing at Chicago, in the county of Cook and State of Illinois, and at Providence, in the county of Providence and State of Rhode Island, respectively, have invented certain new and useful Improvements in Machine-Tools, of which the following is a specification.

This invention relates to a unitary power and hand-operable means for feeding a machine tool carriage, which means is constructed so as to permit either feed to be used independently of the other and without disconnecting one from the other or from the carriage.

The object of the invention is to provide an improved feeding means of this character in which the rotation of the driven screw-threaded element on the carriage is frictionally resisted so as to prevent accidental rotation of said element by its coöperating power-driven element, while at the same time permitting the former element to be rotated at will by the hand-operable feeding means.

The invention is applicable to the tool-holding carriages or work-holding carriages of lathes, milling machines, drilling machines, boring machines, and other machine tools. It is herein disclosed in connection with the tool-holding carriage of a lathe.

Figure 1:
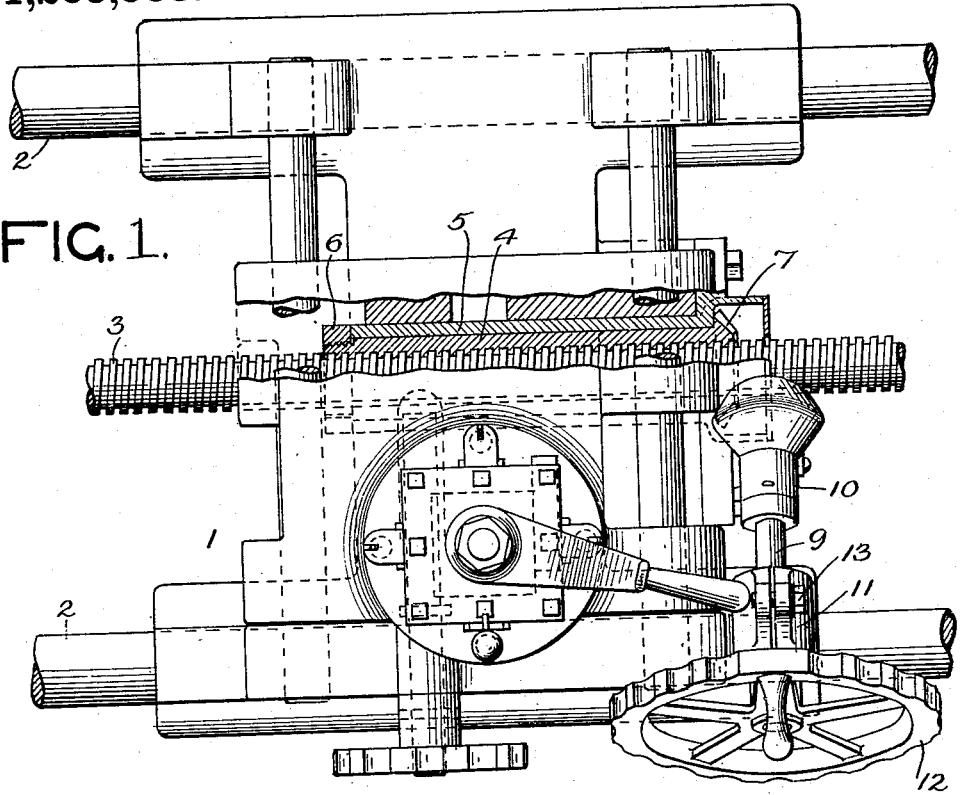
Figure 2:
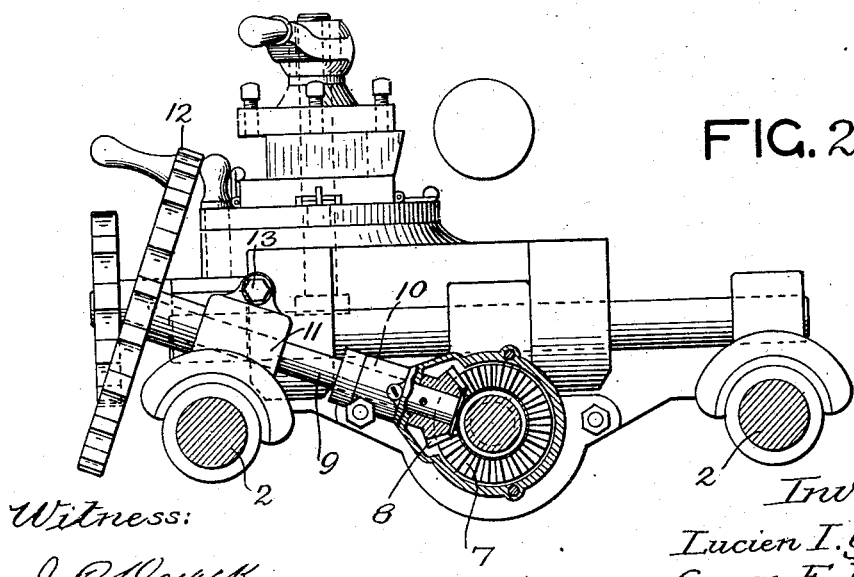

In the accompanying drawings, Figure 1 is a fragmental top plan view of a lathe embodying the features of our invention. Fig. 2 is a view taken from the right-hand side of Fig. 1.

In the drawings, 1 denotes a tool-holding carriage which may be of any suitable form and construction. The carriage 1 is mounted upon two parallel guides or ways 2. While the guides may be of any suitable construction, they are herein shown as consisting of cylindrical rods. The power feed for the carriage 1 includes a feed shaft or lead screw 3 extending parallel with the ways 2 and approximately midway between said ways.

The means for connecting the carriage 1 to the lead screw 3 comprises a nut 4 engaging said lead screw. We have herein shown the nut as the traveling element, although it will be understood that either the screw or the nut may travel. The nut is rotatably mounted within a bearing sleeve 5, said sleeve being fixed in the carriage 1. Longitudinal movement of the nut 4 in one direction with relation to the carriage is prevented by means of a collar 6 on one end of said nut. On the other end of the nut is a bevel gear 7 which constitutes a collar or flange preventing longitudinal movement in the opposite direction with relation to the carriage 1. The bevel gear 7 meshes at all times with a bevel pinion 8, which pinion is secured to the inner end of a shaft 9 mounted in bearings 10 and 11 on the carriage 1. To the outer end of the shaft 9 is fixed a hand-wheel 12.

When the tool carriage 1 is to be moved by the power feed, the lead screw 3 is set in rotation. The leverage of the lead screw upon the nut is so slight, as compared with the resistance to rotation of the nut, that the nut remains stationary with reference to the carriage, and hence the carriage is moved forward or back, depending upon the direction of rotation of the screw. If it be desired to increase the resistance of the nut 4 against rotation, suitable means may be provided for that purpose; for example, the bearing 11 may be made compressible, as herein shown, and provided with a screw 13 by means of which more or less pressure may be applied to the shaft 9. If for any reason it should be desirable to temporarily retard the feed of the carriage 1 (as when an extremely hard spot is encountered in the work), the hand-wheel 12 may be revolved in the direction to revolve the nut 4 rearwardly with reference to the screw 3, thereby decreasing the rate of movement imparted to the carriage by the lead screw. If it be desirable to temporarily accelerate the power feed, as, for example, if there be a space in the work in which there is no cut to be made, the hand-wheel 12 may be revolved in the direction to feed the nut 4 forward upon the screw 3. When the lead screw 3 is at rest, the carriage 1 may be moved in either direction by rotating the hand wheel 12. It will be seen that although the nut and the screw always are in engagement, the hand-feed may be used either alone or in conjunction with or in opposition to the power feed.

In the appended claims, we have used the word carriage to indicate a tool carriage, a work carriage, a drill spindle or an analogous moving part of a machine tool.

We claim as our invention:

1. A machine tool having, in combination, spaced apart guides, a carriage movably supported by said guides, a lead screw and nut located intermediate the guides for moving the carriage, one of said screw-threaded elements being located on the carriage, a shaft on the carriage, a hand wheel on said shaft, gearing connecting the shaft to the screw-threaded element on the carriage, and a split bearing inclosing said shaft and having means for variably clamping the same to frictionally resist rotation of the shaft so as to prevent accidental rotation of said screw-threaded element on the carriage while permitting rotation thereof by said hand wheel.

2. A machine tool having, in combination, spaced apart guides, a carriage movably supported by said guides, a lead screw and nut located intermediate the guides for moving the carriage, one of said screw-threaded elements being located on the carriage, hand-operable means for imparting rotation to the screw-threaded element on the carriage, and adjustable clamping means frictionally engaging the hand operable means to prevent rotation of such screw-threaded element by its coöperating power-driven element but permitting rotation of said element by said hand-operable means.

In testimony whereof we hereunto set our hands.

LUCIEN I. YEOMANS.
GEORGE F. BRYANT.

Copies of this patent may be obtained for five cents each, by addressing the "Commissioner of Patents, Washington, D. C."